(12) United States Patent
Jinno et al.

(10) Patent No.: US 7,537,443 B2
(45) Date of Patent: May 26, 2009

(54) MOLD CLAMPING SYSTEM

(75) Inventors: Shizuo Jinno, Aichi-ken (JP); Atsushi Tsukamoto, Aichi-ken (JP)

(73) Assignee: Kabushiki Kaisha Meiki Seisakusho, Aichi-Ken (JP)

( * ) Notice: Subject to any disclaimer, the term of this patent is extended or adjusted under 35 U.S.C. 154(b) by 0 days.

(21) Appl. No.: 11/849,893

(22) Filed: Sep. 4, 2007

(65) Prior Publication Data

US 2008/0057151 A1    Mar. 6, 2008

(30) Foreign Application Priority Data

Sep. 4, 2006  (JP) .............................. 2006-238688

(51) Int. Cl.
*B29C 45/80* (2006.01)
(52) U.S. Cl. ...................................... 425/190; 425/595
(58) Field of Classification Search ................. 425/150, 425/190, 595, 451.9
See application file for complete search history.

(56) References Cited

U.S. PATENT DOCUMENTS

| | | | | |
|---|---|---|---|---|
| 4,874,309 A | * | 10/1989 | Kushibe et al. | 425/595 |
| 5,135,385 A | * | 8/1992 | Fukuzawa et al. | 425/595 |
| 5,192,557 A | * | 3/1993 | Hirata et al. | 425/595 |
| 5,338,171 A | * | 8/1994 | Hayakawa et al. | 425/595 |
| 5,863,474 A | * | 1/1999 | Ito et al. | 425/595 |
| 6,655,949 B2 | * | 12/2003 | Chikazawa et al. | 425/190 |
| 6,821,104 B2 | * | 11/2004 | Kubota et al. | 425/150 |
| 6,932,924 B2 | * | 8/2005 | Nishizawa et al. | 425/190 |
| 7,179,409 B2 | * | 2/2007 | Nishino | 425/190 |
| 7,288,221 B2 | * | 10/2007 | Tsuji et al. | 425/595 |
| 2005/0025856 A1 | * | 2/2005 | Nishino | 425/595 |

FOREIGN PATENT DOCUMENTS

| | | |
|---|---|---|
| JP | 08276482 | 10/1996 |
| JP | 2003340827 | 12/2003 |
| JP | 2005053022 | 9/2007 |

* cited by examiner

*Primary Examiner*—James Mackey
(74) *Attorney, Agent, or Firm*—Browdy and Neimark, P.L.L.C.

(57) ABSTRACT

A mold clamping system using mold opening and closing mechanisms to move a movable platen toward a fixed platen, engaging half nuts with engagement parts formed at tie bars, and using clamping cylinders to pull tie bars and clamp the mold, provided with position adjustment rods arranged on the opposite sides from the mold attachment surfaces of pistons of the clamping cylinders, a plurality of adjustment cylinders arranged, in parallel with the position adjustment rods, on the fixed platen or movable platen at the side where the clamping cylinders are arranged, and connection members connecting rods of the adjustment cylinders and the position adjustment rods, whereby the mold clamping system is shortened in overall length and simple mechanisms are used to control the position adjustment of the tie bars with a high precision.

4 Claims, 2 Drawing Sheets

MOLD CLAMPING SYSTEM

BACKGROUND OF THE INVENTION

1. Field of the Invention

The present invention relates to a mold clamping system of an injection molding machine or the like, more particularly relates to a mold clamping system which uses mold opening and closing mechanisms to move a movable platen toward a fixed platen, engages half nuts with engagement parts formed at tie bars, then uses clamping cylinders to pull the tie bars and clamp the mold.

2. Description of the Related Art

In the past, as mold clamping systems which use mold opening and closing mechanisms to move a movable platen toward a fixed platen, engage half nuts with engagement parts formed at tie bars, and use clamping cylinders to pull the tie bars and clamp the mold, the ones described in Japanese Patent Publication (A) No. 8-276482, Japanese Patent Publication (A) No. 2003-340827, and Japanese Patent Publication (A) No. 2005-53022 (U.S. Pat. No. 7,179,409) have been known. In these mold clamping systems, it is necessary to adjust the positions of the tie bars in order to engage the half nuts with the engagement parts of the tie bars. Mechanisms are provided for that.

In Japanese Patent Publication (A) No. 8-276482, as shown in FIG. 1, sub cylinders for adjusting the positions of the tie bars are attached to rams of clamping hydraulic cylinders. However, the mechanism of Japanese Patent Publication (A) No. 8-276482 has the problem that the overall length of the mold clamping system becomes long. Further, as a system for solving problem of Japanese Patent Publication (A) No. 8-276482, there is the one described in Japanese Patent Publication (A) No. 2003-340827. In Japanese Patent Publication (A) No. 2003-340827, actuators are provided on the insides of the clamping cylinders. The actuators are connected to the clamping cylinders through link mechanisms and position adjustment rods. However, in Japanese Patent Publication (A) No. 2003-340827, the link mechanisms etc. are complicated. This leads to a cost increase. Further, in Japanese Patent Publication (A) No. 2005-53022 (U.S. Pat. No. 7,179,409), a servomotor mechanism, first cylinder, and second cylinder are separately necessary, so the structure is complicated. This leads to a cost increase.

SUMMARY OF THE INVENTION

An object of the present invention to provide a mold clamping system using mold opening and closing mechanisms to move a movable platen toward a fixed platen, engaging half nuts with engagement parts formed at tie bars, and using clamping cylinders to pull tie bars and clamp the mold wherein the mold clamping system is shortened in overall length and simple mechanisms not using servomotors or the like are used to control the position adjustment of the tie bars with a high precision.

The mold clamping system of the present invention is a mold clamping system provided with mold opening and closing mechanisms which make a movable platen to which a movable mold is attached move to approach or separate from a fixed platen to which a fixed mold is attached, clamping cylinders clamping the fixed mold and the movable mold, tie bars formed with engagement parts at their outer circumferences and pulled by the clamping cylinders, and half nuts engageable and disengageable with respect to the engagement parts, the mold clamping system further provided with position adjustment rods arranged on the opposite sides from the mold attachment surfaces of pistons of the clamping cylinders, a plurality of adjustment cylinders arranged in parallel with the position adjustment rods at the fixed platen or movable platen at the side where the clamping cylinders are arranged, and connection members connecting rods of the adjustment cylinders and the position adjustment rods. Further, the adjustment cylinders preferably are double rod cylinders controlled by a servo valve.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Figure 1:
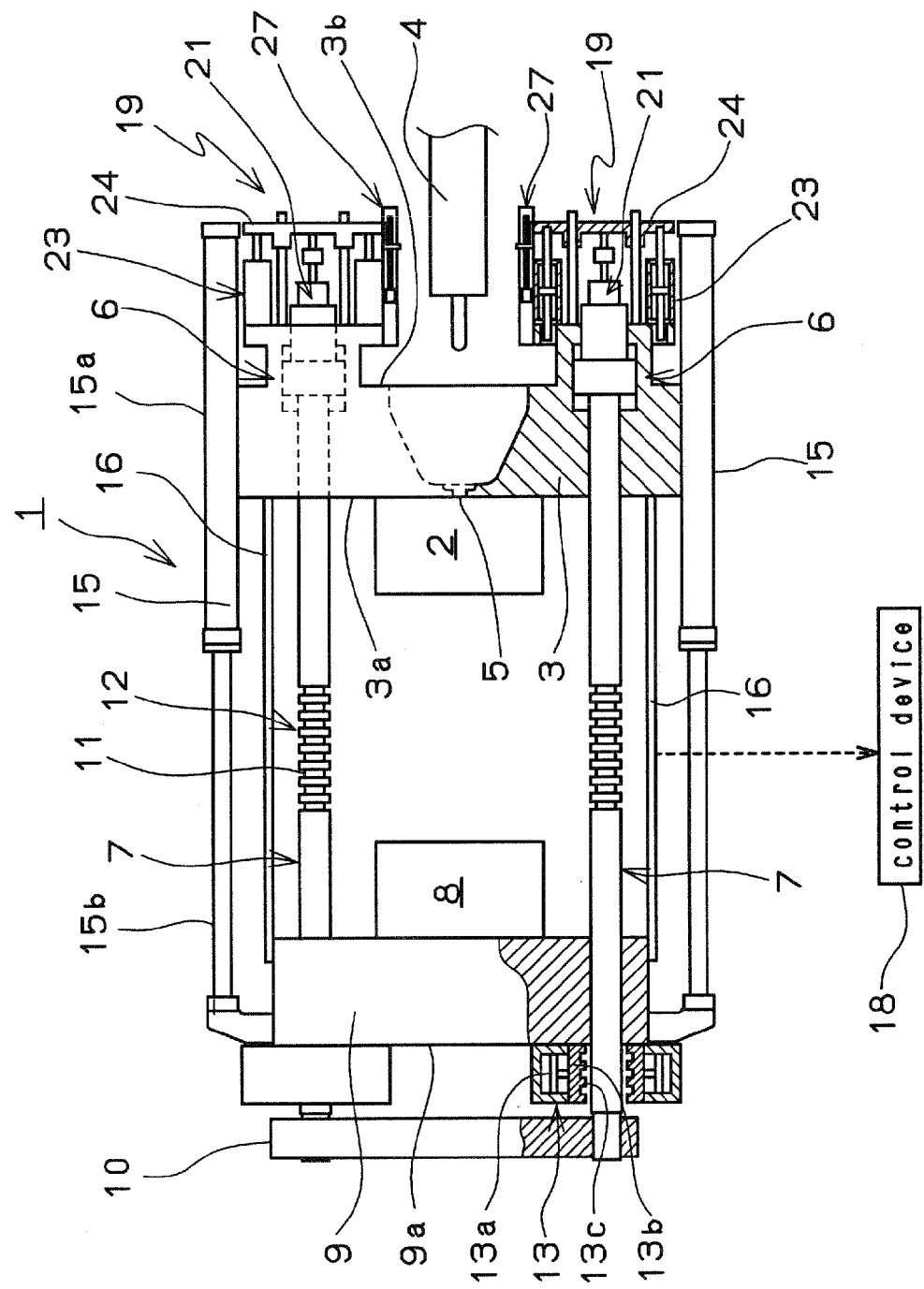
FIG. 1 is a side view showing a mold clamping system of the present invention.
Figure 2:
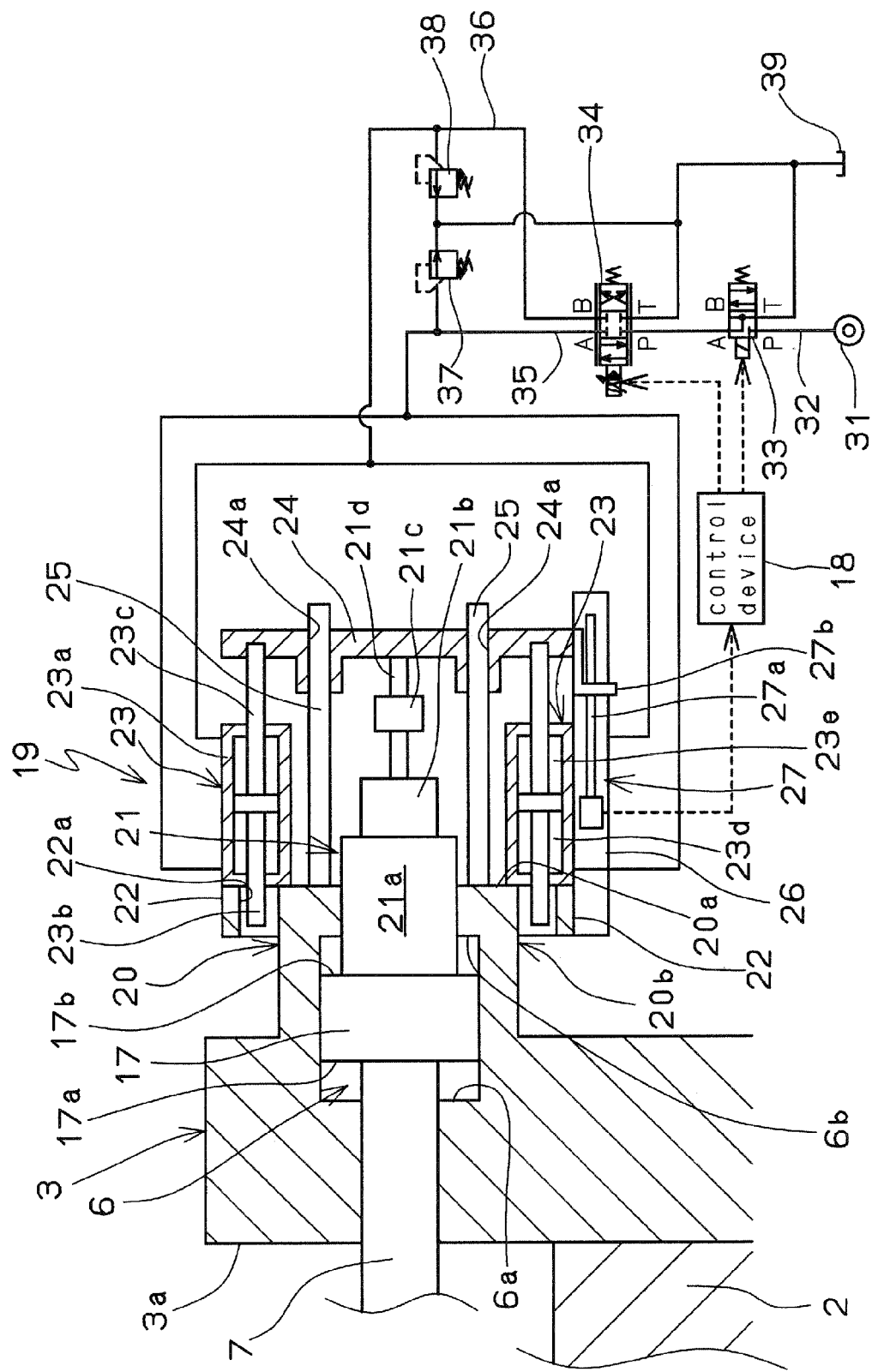
FIG. 2 is an enlarged side view showing an outline of an engagement position adjustment mechanism and a hydraulic circuit of the mold clamping system of the present invention.

As shown in FIGS. 1 and 2, a mold clamping system 1 of the injection molding machine which injection molds shaped articles made of a resin, metal, ceramic, etc. has a fixed platen 3 on which a fixed mold 2 is attached to a mold attachment face 3a fastened on a not shown bed. At the center part of the fixed platen 3, an injection hole 5 is provided for injecting and filling molten resin from an injection unit 4 to the fixed mold 2. Further, in the vicinities of the four corners of the fixed platen 3, clamping mechanisms constituted by clamping cylinders 6 are respectively provided. The clamping cylinders 6 are reciprocating cylinders having pressure increasing strokes, forced mold opening strokes, and strokes giving predetermined margins. The four tie bars 7 arranged at the surfaces 17a of the mold attachment surface sides of pistons 17 of the clamping cylinders 6 are passed through the vicinities of the four corners of the movable platen 9 to which the movable mold 8 is attached, then first end sides of the tie bars 7 are passed through a support platen 10. Engagement parts 12 at which pluralities of engagement grooves 11 are formed over predetermined lengths in the mold opening and closing direction are provided at predetermined positions of the outer circumferences of the tie bars 7. The engagement grooves 11 engaged with half nuts 13 can be changed in accordance with the thickness of the mold attached. Further, the half nuts 13 are arranged at the two sides of the portions through the tie bars 7 are passed in the vicinities of the four corners of the opposite fixed platen side wall surfaces 9a at the movable platen 9. The half nuts 13 are designed so that engagement teeth 13b are made to advance or retract by cylinders 13a so as to able to engage and disengage with and from engagement parts 12 of the passed tie bars 7.

At the two side surfaces of the fixed platen 3, mold opening and closing mechanisms for making a movable platen 9 to which the movable mold 8 is attached approach and separate from the fixed platen 3 to which the fixed mold 2 is attached, that is, cylinder parts 15a of mold opening and closing cylinders 15, are fixed. The piston rods 15b are attached to the movable platen 9. Note that for the mold opening and closing mechanisms, mechanisms comprising servomotors, ball screws, and the like may be used. Further, between the fixed platen 3 and the movable platen 9, movable platen position detection mechanisms, that is, linear scales 16, are attached at four locations at positions near the clamping cylinders 6, but it is also possible to provide such a mechanism at just one location or more. Further, in this embodiment, the detection values of the linear scales 16 are sent to the control device 18 for adjustment of the positions of the tie bars 7 when adjusting the mold thickness by replacing a mold with another mold having a different thickness.

Next, using FIG. 2, engagement position adjustment mechanisms 19 of the mold clamping system 1 of the present embodiment will explained. Each engagement position adjustment mechanism 19 makes half nuts 13 engage with the optimal engagement grooves 11 of the engagement part 12 formed at the corresponding tie bar 7, so moves the tie bar 7. One mechanism is provided for each clamping cylinder 6.

The opposite attachment surface of the fixed platen 3, that is, the injection unit side wall surface 3b, has cylindrical parts 20 incorporating the clamping cylinders 6 and formed projecting out to the injection unit 4 sides by exactly predetermined dimensions. Further, at the surfaces 17b of the injection unit sides of the opposite sides from the surfaces 17a of the mold attachment surface sides of the pistons 17 of the clamping cylinders 6, position adjustment rods 21 are fixed. Each position adjustment rod 21 is provided with a large diameter part 21a provided so that part projects out from the center of the injection unit side wall surface 20a of the corresponding cylindrical part 20, a small diameter part 21b connected to the large diameter part 21a, a floating joint 21c connected to the small diameter part 21b and forming a rotation absorbing member, and a connection part 21d connected to the floating joint 21c. The floating joint 21c is a rotation absorbing member which enables adjustment in the shaft rotation direction and the shaft angle direction without changing the length in the axial direction, but it is also possible to use another member having a similar function.

Further, at the side wall surface 20b of each cylindrical part 20, brackets 22, 22 projecting out in directions perpendicular to the working direction of the piston 17 of the clamping cylinder 6 are arranged. The brackets 22 are members with holes 22a running through their centers. Later mentioned adjustment cylinders, that is, double rod cylinders 23, and a position sensor, that is, a linear scale 27, are fastened to them.

Further, at the surface of the injection unit 4 side of each bracket 22, an actuator of the corresponding engagement position adjustment mechanism 19, that is, a cylinder part 23a of a double rod cylinder 23 (adjustment cylinder), is fastened. A double rod cylinder 23 is a cylinder able to be accurately controlled by a servo valve 34 because one pressure receiving area and the other pressure receiving area of the piston are equal. Each double rod cylinder 23 of the present embodiment is linked with the corresponding clamping cylinder 6. The stroke of the double rod cylinder 23 is larger than the stroke of the clamping cylinder 6 at the two sides. One rod 23b of the double rod cylinder 23 is movably inserted in the hole 22a of the bracket 22. One rod 23b is not attached to any member but remains free. The front end of the other rod 23c of the double rod cylinder 23 is attached to the surface of the side of the connection member 24 opposite to the injection unit. In the present embodiment, double rod cylinders 23 and brackets 22 are attached at two locations in parallel with the position adjustment rod 21 of each clamping cylinder 6, but the number is not limited to two so long as a plurality are provided. In the present embodiment, by providing the brackets 22 at the side wall surfaces 20b of the cylindrical part 20 of each clamping cylinder 6, the movement regions of the rods 23b of the double rod cylinders 23 are secured.

Each connection member 24 is a member of a specific thickness and is arranged in a direction perpendicular to the other rods 23c of the double rod cylinders 23. Further, at the center of the injection unit side wall surface 20a of the cylindrical part 20 at the fixed platen 3, the large diameter part 21a of the position adjustment rod 21 is formed projecting outward. At two locations at the circumference of the member, guide rods 25 are formed projecting out in parallel with the double rod cylinders 23 towards the injection unit 4 side. Further, the guide rods 25, 25 are inserted through the guide holes 24a, 24a formed in the connection member 24.

Further, at one of the brackets 22, a sensor attachment member 26 is fastened facing the injection unit side. At the sensor attachment member 26, a position sensor, that is, the scale part 27a of the linear scale 27, is fixed. Note that in the present embodiment, the position sensor used is a magnetic linear scale, but it is also possible to use an optical sensor, a rotary encoder using a rotary roller etc., or a potentiometer. The type is not limited. Further, a reading use head 27b of the linear scale 27 is fixed at the side part of the connection member 24 moved by the double rod cylinders 23, 23. Note that it is also possible to provide a scale at the connection member 24 side and provide a reading use head at the fixed platen 3 side.

Next, the hydraulic circuit and control device 18 of the double rod cylinders 23 will be explained in brief. In the pipeline 32 from the hydraulic pressure source, that is, the pump 31, to the double rod cylinders 23, 23, a switchover valve 33 and four-way type servo valve 34 are arranged. A pipeline 35 connected to the A port of the servo valve 34 and pipeline 36 connected to the B port are branched out. The pipeline 35 is connected to the clamping direction side oil chambers 23d of the two double rod cylinders 23, while the pipeline 36 is connected to the opening direction side oil chambers 23e. Further, the mold clamping system 1 of the injection molding machine is provided with a control device 18. The control device 18 is respectively connected to the linear scale 27 and the switchover valve 33, servo valve 34, and the like. Further, the pipeline 32 of the servo valve 34, the pipeline 35 connected to the A port, and the pipeline 36 connected to the B port have relief valves 37, 38 connected to them. Note that the hydraulic circuit is an outline. Other pipelines, valves, and the like are omitted of course. By employing the above configuration, the present embodiment can shorten the overall length of the mold clamping system and control the adjustment of position of the tie bars with a high precision by a simple mechanism without using a servo motor etc.

Next, the operation of the engagement position adjustment mechanism 19 of the mold clamping system 1 of the present invention at the time of adjustment of the mold thickness in accordance with the thickness of the replaced mold and at the time of molding will be explained. If the mold used for shaping is changed to one of a different thickness, the interval between the closed fixed platen 3 and movable platen 9 changes and along with this the engagement positions of the half nuts end up changing, so first the mold thickness is adjusted. First, the fixed mold 2 and movable mold 8 are placed between the fixed platen 3 and the movable platen 9 and the mold opening and closing cylinders 15 are operated to close the mold. The position of the movable platen 9 at the time of mold closing (position of the half nuts 13) is detected by movable platen position detection mechanisms, that is, the linear scales 16. The detection values are sent to the control device 18. Then, the control device 18 calculates the positions at which the optimal engagement grooves 11 engage with the half nuts 13 (the positions of the tie bars 7 with respect to the fixed platen 3) based on the sent detection values, and stores the same. The positions at which the optimal engagement grooves 11 engage are the positions where strokes of the pistons 17 in the clamping cylinders 6 are secured enabling pressure increase and forced opening when the tie bars 7 are engaged with the half nuts 13.

(During Molding: Process of Engagement of Half Nuts)

When the positions of the tie bars 7 with respect to the fixed platen 3 are calculated for engagement of the half nuts 13, a command signal is sent from the control device 18 to the servo valve 34, the double rod cylinders 23, 23 are operated, and the pistons 17 and the tie bars 7 of the clamping cylinders 6 are moved via the connection members 24. The positions of the tie bars 7 with respect to the fixed platen 3 at the time of movement are detected by the linear scales 27 reading the positions of the connection members 24. Feedback control using the servo valve 34 is performed. Further, if the tie bars 7 are moved to the stored positions of the tie bars 7 with respect to the fixed platen 3, the double rod cylinders 23, 23 are stopped from operating and are held at their positions. At this case, the tie bar side oil chambers 6a and the position adjustment rod side oil chambers 6b of the clamping cylinders 6 are connected to the drains and are in close to nonpressurized states. Therefore, in the present embodiment, by using the commercially available small-sized double rod cylinders 23 using less working oil compared with the clamping cylinders 6, it is possible to make the clamping cylinders 6 move quickly and accurately.

Next, the mold opening and closing cylinders 15 are driven to move the movable platen 9 toward the fixed platen 3. Substantially simultaneously with the movable mold 8 and the fixed mold 2 abutting, the cylinders 13a are operated and the half nuts 13 are engaged with the engagement grooves 11 of the tie bars 7. At that time, the tie bars 7 stand by after finishing moving to the positions where the optimal engagement grooves 11 are engaged in the half nuts 13. When the half nuts 13 are engaged with the engagement grooves 11, in the present embodiment, there are predetermined spaces between the two side wall surfaces of the peaks 13c of the engagement teeth 13b of the half nuts 13 and the two sidewall surfaces of the engagement grooves 11 of the engagement parts 12. Further, the clamping cylinders 6 are at positions where strokes of the pistons 17 enabling pressure increase and forced opening are secured. Further, naturally, the adjustment cylinders, that is, double rod cylinders 23, 23, are, like the clamping cylinders 6, at positions where the strokes (including extra margins) able to keep up with the pressure increase and forced opening are secured.

(During Molding: Pressure Increase Process)

When the engagement of the engagement teeth 13b of the half nuts 13 with the engagement grooves 11 is confirmed, working oil is supplied to the tie bar side oil chambers 6a of the clamping cylinders 6 and the tie bars 7 are pulled in the mold closing direction, whereby the movable mold 8 and the fixed mold 2 are clamped. At this time, the predetermined spaces between the mold opening side wall surfaces of peaks 13c of the half nuts 13 (in the figure, the left side wall surfaces) and the mold opening side wall surfaces of the engagement grooves 11 of the tie bars 7 (in the figure, the left side wall surfaces) are eliminated and the two surfaces abut due to the movement of the tie bars 7 in the mold closing direction. Note that the case where the pistons 17 end up rotating before the clamping cylinders 6 are operated and the pressure increase starts may also be envisioned, but in the present embodiment, floating joints 21c are used for the position adjustment rods 21, so the rotation will not be transmitted to the connection members 24. Further, in the pressure increase process, the tie bars 7 are further moved to the mold closing direction slightly due to the operation of the clamping cylinders 6. Note that in the pressure increase process, the switchover valve 33 is switched so that the T port and A port are connected, and the servo valve 34 is controlled so that the A port and P port and the B port and T port are connected and working oil is drained from the clamping direction side oil chambers 23d and the opening direction side oil chambers 23e to the tank 39. Note that it is also possible to connect the clamping direction side oil chambers 23d and mold opening direction side oil chambers 23e by a pipeline with a shutoff valve and form a differential circuit through which oil can move free of a load. In the pressure increase process, the molten resin is injected and filled in the cavity from the injection unit 4 via the injection hole 5, then the shaped article is cooled.

(During Molding: Pressure Release Process and Forced Opening Process)

When the shaped article finishes being cooled, the oil of the tie bar side oil chambers 6a of the clamping cylinders 6 is drained and the pressure is released. The pistons 17 move slightly to the mold opening sides compared with during the pressure increase. Next, when the pressure finishes being released, oil is supplied to the position adjustment rod side oil chambers 6b of the clamping cylinders 6 and the tie bars 7 are moved to the mold opening direction, whereby the forced mold opening process is started. The position adjustment rod side oil chambers 6b of the clamping cylinders 6 have smaller pressure receiving areas compared with the tie bar side oil chambers 6a, so movement is possible with comparatively small amounts of working oil. Note that at the start of the mold opening, due to the forced opening of the mold by the operation of the clamping cylinders 6, even deep objects and other difficult to release shaped articles can be released without limitation. At the start of the forced opening process, the piston rods of the clamping cylinders 6, that is, the tie bars 7, move toward the mold opening side, the mold closing side wall surfaces of the peaks 13c of the half nuts 13 (in the figure, the right side wall surfaces) and the mold closing side wall surfaces of the engagement grooves 11 of the engagement parts 12 (in the figure, the right side wall surfaces) are abutted, and conversely predetermined spaces are formed between the mold opening side wall surfaces of the peaks 13c (in the figure, the left side wall surfaces) and the mold opening side wall surfaces of the engagement grooves 11 (in the figure, the left side wall surfaces). Consequently, the tie bars 7 and connection members 24 are moved toward the mold opening sides by the amounts of the predetermined spaces at the two sides formed between the two side wall surfaces of the peaks 13c of the engagement teeth 13b of the half nuts 13 and the two side wall surfaces at the engagement grooves 11 of the engagement parts 12 compared with the time of completion of the pressure release process. Then, the force is transmitted to the half nuts 13 via the tie bars 7, the movable mold 8 is moved in the mold opening direction, and the forced mold opening process is performed. At the time of these pressure release process and forced mold opening process as well, the switchover valve 33 and servo valve 34 connected to the double rod cylinders 23 are controlled so that the working oil is drained from the clamping direction side oil chambers 23d and the mold opening direction side oil chambers 23e to a tank 39.

(During Molding: Half Nut Disengagement Process)

When the forced mold opening process is completed, the cylinders 13a are driven to disengage the half nuts 13 from the engagement grooves 11. In the present embodiment, the positions of the tie bars 7 at the point of time of the end of the forced mold opening strokes are shifted to the mold opening sides by the amounts of the forced mold opening stroke+one of the predetermined spaces formed between the half nuts 13 and the engagement grooves 11 compared with the positions of engagement of the half nuts 13 and tie bars 7 before the start of pressure increase. Note that in the half nut disengagement process, it is also possible to make the tie bars 7 move slightly toward the mold closing side by at least one of the clamping cylinders 6 and double rod cylinders 23, 23 or make the movable platen 9 move slightly in the mold opening direction by the mold opening and closing cylinders 15, 15, then disengage the half nuts 13 from the engagement grooves 11.

(During Molding: Mold Opening Process)

When the half nuts 13 finish being disengaged, the movable platen 9 is moved to the mold opening completion position by the mold opening and closing cylinders 15 and the shaped article is removed. In the present embodiment, while the half nuts 13 and the engagement grooves 11 of the tie bars 7 are not engaged, working oil is supplied to the clamping direction side oil chambers 23d of the double rod cylinders 23, 23, and the tie bars 7 return to the positions where the optimal engagement grooves 11 are engaged with the half nuts 13 stored in the control device 18 during the mold thickness adjustment. Consequently, the present embodiment enables control of position adjustment of the tie bars 7 with a high precision by a simpler mechanism compared with the position adjustment of the tie bars performed by a servomotor in the past. Further, the overall length of the mold clamping system 1 is shortened compared with the system described in Japanese Patent Publication (A) No. 8-276482, and the structure is extremely simplified compared to the system described in Japanese Patent Publication (A) No. 2003-340827.

Note that the present invention can also be used for a mold clamping system other than the mold clamping system 1 in which clamping cylinders 6 and engagement position adjustment mechanisms 19 are arranged at the fixed platen 3 and half nuts 13 are arranged at the movable platen 9. For example, it may also be a mold clamping system in which clamping cylinders and engagement position adjustment mechanisms are arranged at the movable platen and half nuts are arranged at the fixed platen. Further, it may also be a mold clamping system in which the center shafts of the tie bars are arranged across the fixed platen and movable platen, the clamping cylinders are arranged at one of the fixed platen or movable platen, piston rods of the clamping cylinders are slidably inserted over the circumferences of the center shafts of the tie bars, tie bars are formed from both of the center shafts and piston rods, and half nuts are arranged at the other platen. Further, it may also be a vertical clamping system where the fixed platen and the movable platen are arranged in the vertical direction, the half nuts are engaged with the engagement parts of the tie bars, then the clamping cylinders are used for clamping the mold. Further, it may also be a mold clamping system for injection compression molding or a mold clamping system for injection molding where, other than making the position where the parting side surfaces of the fixed mold and the movable mold are made to completely abut against each other the mold closing completion position, the stopping position of the movable mold is set slightly to the rear and the movable mold is moved further to the fixed mold side simultaneously with injection of the molten resin, during injection, or after injection. In the case of injection compression molding and injection press molding, the clamping cylinders are used for rapid compression and the working oil is rapidly transmitted from the mold opening direction side oil chambers of the double rod cylinders. Double rod cylinders have smaller capacities (volumes) of the mold opening direction side oil chambers compared with usual cylinders without rods by exactly the volumes of the rods, so the amounts of oil sent become smaller. The transmission of working oil is almost never obstructed even with the usual piping by that amount. Further, cases where the mold is opened at the time of end of shaping rather than the start of clamping due to foaming and the case where the process of forced opening is performed by a mold opening and closing means and is not performed by clamping cylinders may also be envisioned. In all of the above injection compression molding, injection press molding, foaming, and case of not performing forced mold opening, when one molding cycle ends and the mold is opened, the position adjustment cylinders of the engagement position adjustment mechanism are used to return the tie bars to the stored initial positions. This point is the same.

While the invention has been described with reference to specific embodiments chosen for purpose of illustration, it should be apparent that numerous modifications could be made thereto by those skilled in the art without departing from the basic concept and scope of the invention.

The invention claimed is:

1. A mold clamping system comprising:
a mold opening and close mechanism which moves a movable platen to which a movable mold is attached to approach or separate from a fixed platen to which a fixed mold is attached;
clamping cylinders clamping the fixed mold and the movable mold located on the fixed platen;
tie bars formed with engagement parts at their outer circumferences and pulled by the clamping cylinders,
half nuts fixed on the movable platen engageable and disengageable with respect to the engagement parts,
wherein each of said clamping cylinders has a first piston slidably engaged therein,
wherein said tie bars respectively extend through first closed ends of said clamping cylinders and are respectively fixed to a first side of said first pistons;
position adjustment rods extending through second closed ends of said clamping cylinders respectively fixed to a second side of said first pistons;
a plurality of adjustment cylinders fixed to the end of each of the clamping cylinders;
a second piston slidably engaged within each of said plurality of adjustment cylinders having a first rod and a second rod respectively fixed to and extending out from opposite sides of said second piston through closed ends of each of said plurality of adjustment cylinders;
wherein said first and said second rods are parallel to both said tie bars and position adjustment rods;
an end of each of said position adjustment rods respectively is fixed to connection members;
wherein an end of the second rod of said plurality of adjustment cylinders is respectively fixed to said connection members while a free end of said first end rod is unengaged.

2. The mold clamping system according to claim 1, wherein a position sensor is fixed on each of said position adjustment rods between said clamping cylinders and said connection members.

3. The mold clamping system according to claim 1, wherein the stroke length of the second piston of the adjustment cylinders is longer than that of the first piston of the clamping cylinders.

4. The mold clamping system according to claim 1, wherein said adjustment cylinders are actuated by a hydraulic system which opens through the adjustment cylinders to both of the opposite sides of the second piston to initiate movement of the second piston by means of a servo valve.

* * * * *